US008770663B2

(12) United States Patent
Zack (10) Patent No.: US 8,770,663 B2
(45) Date of Patent: Jul. 8, 2014

(54) COMBINATION SHOPPING CART AND HIGH CHAIR COVER WITH PLUSH CHARACTER

(75) Inventor: Elizabeth Zack, Brooklyn, NY (US)

(73) Assignee: Infantino, LLC., San Diego, CA (US)

( * ) Notice: Subject to any disclaimer, the term of this patent is extended or adjusted under 35 U.S.C. 154(b) by 0 days.

(21) Appl. No.: 13/561,962

(22) Filed: Jul. 30, 2012

(65) Prior Publication Data

US 2013/0264852 A1 Oct. 10, 2013

Related U.S. Application Data (60) Provisional application No. 61/620,345, filed on Apr. 4, 2012.

(51) Int. Cl.
A47D 1/10 (2006.01)
A47C 31/00 (2006.01)
B62B 3/14 (2006.01)
B60N 2/28 (2006.01)
A47D 15/00 (2006.01)
B60N 2/60 (2006.01)

(52) U.S. Cl.
CPC ............ B62B 3/1448 (2013.01); B60N 2/2881 (2013.01); A47D 15/006 (2013.01); B60N 2/60 (2013.01)
USPC ................... 297/256.17; 297/219.12; 297/181

(58) Field of Classification Search
CPC .... B62B 3/144; B62B 3/1448; B62B 3/1452; A47D 15/006; B60N 2/2881; B60N 2/28; B60N 2/60

USPC ................... 297/219.12, 256.17, 181, 188.07
See application file for complete search history.

(56) References Cited

U.S. PATENT DOCUMENTS

| | | | | |
|---|---|---|---|---|
| 4,695,092 A | * | 9/1987 | Hittie | 297/219.12 |
| 5,551,749 A | * | 9/1996 | Reher et al. | 297/219.12 |
| 6,237,998 B1 | * | 5/2001 | Aprile | 297/219.12 |
| 6,851,749 B2 | * | 2/2005 | Norman | 297/256.17 |
| 7,029,066 B1 | * | 4/2006 | Myers-Jones | 297/219.1 |
| 7,100,982 B2 | * | 9/2006 | Lundgren | 297/256.17 |
| 7,798,569 B2 | * | 9/2010 | Comarella | 297/188.2 |
| 2003/0227202 A1 | * | 12/2003 | Endicott et al. | 297/256.17 |

FOREIGN PATENT DOCUMENTS

JP 09234223 A * 9/1997

* cited by examiner

*Primary Examiner* — Milton Nelson, Jr.
(74) *Attorney, Agent, or Firm* — Stetina Brunda Garred & Brucker (57) ABSTRACT

Provided is a seat cover for use with a seat, such as a seat of a shopping cart, high chair or the like. The seat includes a front wall, rear wall and a pair of opposed side walls. The seat cover includes a liner having a front panel, a pair of opposed side panels, and a rear panel. The linear is configured to be placeable within the seat such that front panel resides adjacent the seat front wall, the rear panel resides adjacent the seat rear wall, and the pair of opposed side panels reside adjacent respective ones of the pair of opposed seat side walls. The seat cover additionally includes a character connected to the liner and positioned relative to the liner such that when the liner is placed within the seat, the character appears to be seating within the seat.

20 Claims, 5 Drawing Sheets

COMBINATION SHOPPING CART AND HIGH CHAIR COVER WITH PLUSH CHARACTER

CROSS-REFERENCE TO RELATED APPLICATIONS

This application claims the benefit of U.S. Provisional Application No. 61/620,345, filed Apr. 4, 2012, the disclosure of which is incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to infant products, and more particularly to a seat cover for a shopping cart seat or high chair, wherein the seat cover includes a liner and a plush character.

2. Description of the Related Art

As is well known to parents, conventional shopping carts or buggies are typically equipped with a seat for accommodating an infant or toddler. The seat is typically located adjacent the handlebar used to push the shopping cart and oriented such that the infant or toddler placed within the seat faces the adult pushing the shopping cart. The shopping cart is outfitted with a plastic flap which may be extended along the seat bottom to provide a firm, smooth surface for the buttocks of the infant within the seat, with the shopping cart further being configured to define a pair of openings adjacent such plastic flap to accommodate respective ones of the infant's or toddler's legs.

Though the seat of the shopping cart is provided with the above-described plastic flap, the majority of the seat is defined by the structural rods or members used to form the shopping cart. In this regard, that portion of the shopping cart defining the backrest of the seat typically consists of the steel bars alone, thus being extremely uncomfortable for the infant or toddler leaning against the back of the seat.

In recognition of the configuration of the seats within most shopping carts, there has been developed in the prior art various shopping cart seat covers which are adapted to be placed within the seat of a shopping cart to function as a cushioning liner which makes the seat substantially more comfortable for the infant or toddler placed therein.

Though these shopping cart seat covers provide an increased comfort level for the infant, they are generally devoid of any features specifically designed to provide interest or entertainment to the infant when seated therein. Thus, the infant or toddler may be reluctant to be seated within the seat cover, or may quickly become bored after sitting in the seat cover for a short period of time.

The present invention provides a uniquely configured shopping cart seat cover or insert which may be interfaced to a shopping cart in a traditional manner, and is specifically adapted to include a plush character to provide an inviting environment for the toddler seated therein. These, and other advantages of the present invention, will be discussed in more detail below.

BRIEF SUMMARY OF THE INVENTION

In accordance with the present invention, there is provided a seat cover for use with a seat, such as a seat of a shopping cart, high chair or the like. The shopping cart seat includes a front wall, rear wall and a pair of opposed side walls. The seat cover includes a liner having a front panel, a pair of opposed side panels, and a rear panel. The linear is configured to be placeable within the seat such that front panel resides adjacent the seat front wall, the rear panel resides adjacent the seat rear wall, and the pair of opposed side panels reside adjacent respective ones of the pair of opposed seat side walls. The seat cover additionally includes a character connected to the liner and positioned relative to the liner such that when the liner is placed within the seat, the character appears to be seating within the seat.

The character may include a character body and a character bottom. The character body may be attached to the liner rear panel and the character bottom may be connected to the pair of opposed side panels. The character may further include a pair of lateral members, such as wings or arms, connected to the character body. The character may additionally include a pair of feet or leg member connected to the character bottom. The pair of leg members may extend through respective ones of a pair of leg openings formed in the front panel. The character may be formed from a plush material.

The liner may include one or more strips of elastic to conform the shape of the liner to the shape of the seat. The liner may include a substantially continuous peripheral edge that is expandable to fit the liner over the seat, and is subsequently contractible to conform the peripheral edge of the liner to the specific contour of the shopping cart seat.

The seat cover may include a safety harness configured to define a looped configuration about the infant seated within the seat to secure the infant therein. The harness may extend through a pair of spaced openings formed within the character. The harness may include complimentary first and second fasteners to define the looped configuration around the toddler seated within the seat cover.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
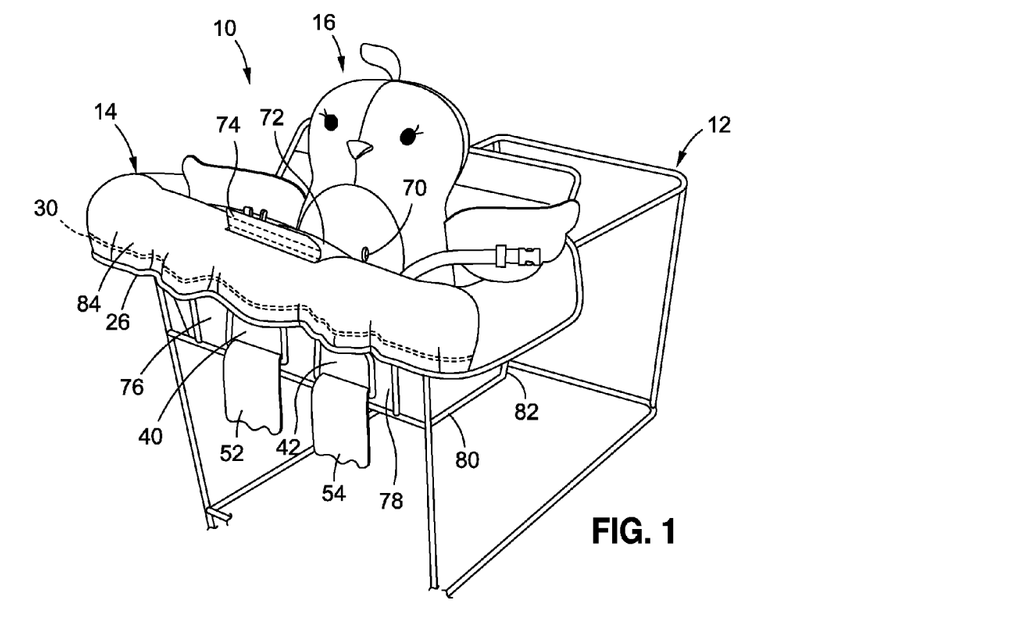
FIG. 1 is an upper perspective view of a seat cover constructed in accordance with a first embodiment of the present invention.
Figure 2:
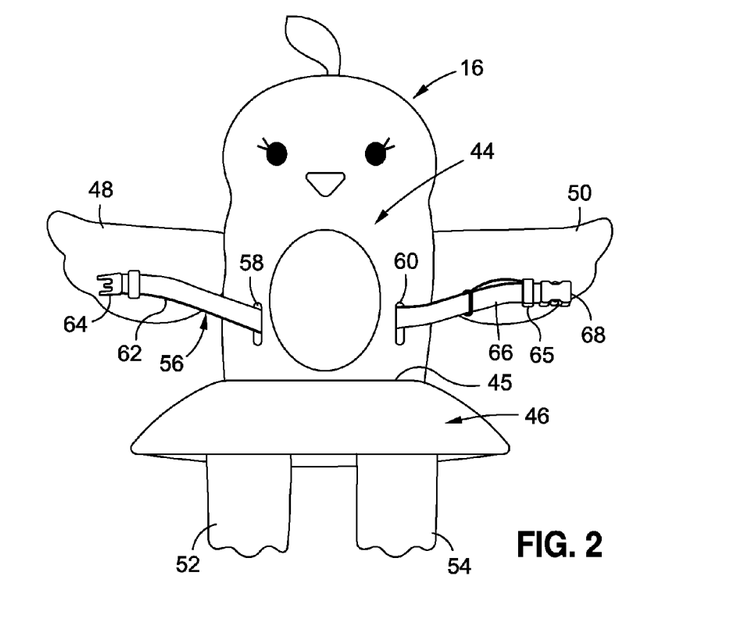
FIG. 2 is a front view of a character used in the seat cover shown in FIG. 1.
Figure 3:
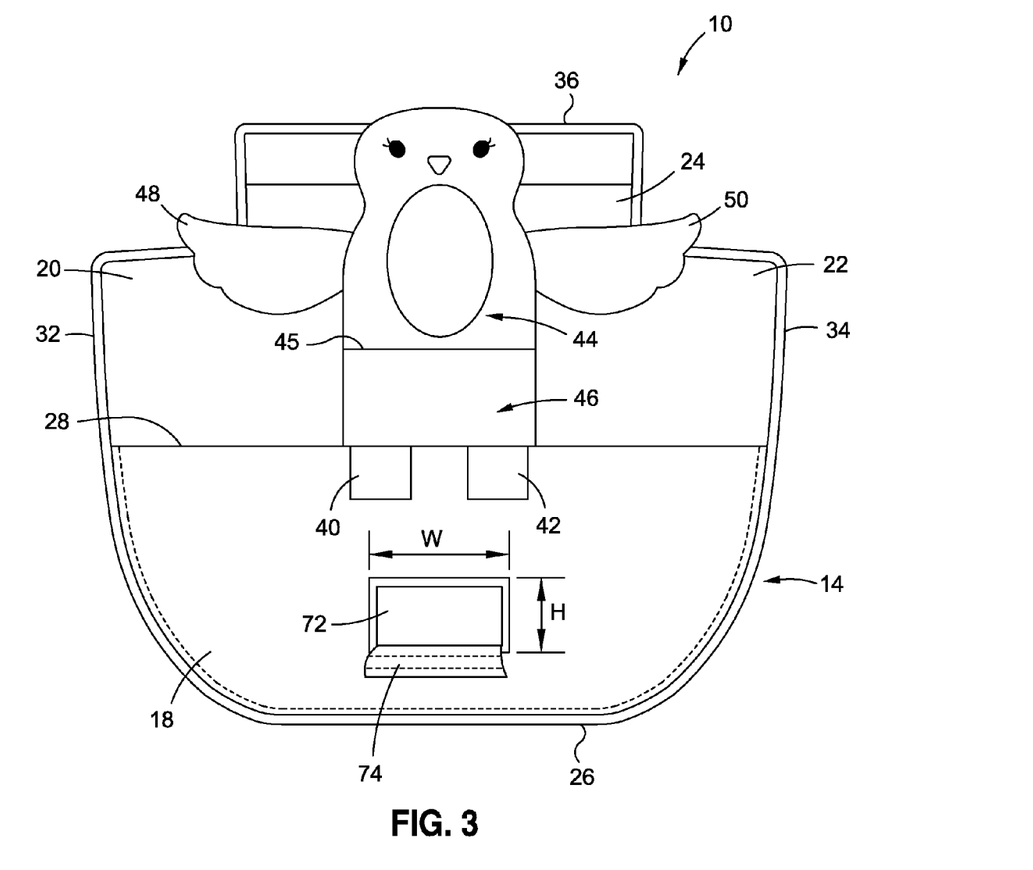
FIG. 3 is a plan view of the seat cover.

Referring now to the drawings, wherein the showings are for purposes of illustrating a preferred embodiment of the present invention only, and not for purposes of limiting the same, FIGS. 1-3 provide a seat cover 10 for use with a shopping cart 12. The seat cover 10 is configured to be interfaced with the shopping cart seat in a conventional manner and includes a liner 14 and a plush character 16 connected to the liner 14 to provide a more appealing environment for the toddler disposed within the shopping cart seat.

Although the seat cover 10 is described herein as being configured for use with a shopping cart seat, it is expressly contemplated that the seat cover 10 may also be adapted for use in a high chair, booster seat, or other infant/toddler seats commonly used.

The liner/primary panel 14 includes a front/forward panel 18, a pair of opposed side panels 20, 22, and a rear panel 24. The pair of opposed side panels 20, 22 are connected to the front panel 18 and the rear panel 24. The liner 14 is configured such that when it is placed within the shopping cart seat, the front panel 18 extends along the front of the shopping cart seat, i.e., the portion of the seat through which the toddler's legs extend, the side panels 20, 22 extend along the sides of the seat, and the rear panel 24 extends along the rear or back support of the seat.

The front panel 18 includes a front peripheral edge 26 and a first edge 28. The side panels 20, 22 are connected to the front panel 18 along the first edge 28. As will be explained in more detail below, the front panel 18 includes a fastening member/elastic strap 30 positioned adjacent the front peripheral edge 26 for connecting the seat cover 10 to the shopping cart seat. The side panels 20, 22 define respective side peripheral edges 32, 34 which extend from the front peripheral edge 26 and the rear panel 24 defines a rear peripheral edge 36 which extends between the pair of side peripheral edges 32, 34. The rear panel 24 may include a pocket designed to slip over the back of the shopping cart seat. An elastic strip may be disposed within the rear panel 24 to tightly conform the rear panel 24 to the contours of the shopping cart seat.

The front panel 18 further includes a pair of leg openings 40, 42 formed therein to accommodate the toddler's legs during use. In the exemplary embodiment, the leg openings 40, 42 extend into the front panel 18 from the first edge 28 and define a generally quadrangular shape, although other shapes may be defined by the leg openings 40, 42, such as a circular shape, without departing from the spirit and scope of the present invention.

The liner 14 is preferably fabricated from two layers of fabric material, having a cushioning material therebetween so as to impart the liner 14 with a preferable level of plushness and softness. The fabric used to fabricate the two layers of the liner 14 preferably includes decorative indicia to give the liner 14 an aesthetic appeal.

The liner 14 is disposable within the shopping cart seat to substantially cover the portions of the shopping cart 12 defining the shopping cart seat. In this regard, the seat cover 10 may conceal any dirt or debris on the shopping cart 12 to provide a hygienic surface for the infant or toddler to sit on. Thus, the toddler may interface directly with the seat cover 10, as opposed to the shopping cart 12. Furthermore, the lower surface of the liner 14 may be formed from a water resistant material to protect the toddler from any wetness that may be present on the shopping cart 12.

The seat cover 10 additionally includes a character 16 connected to the liner 14. The character 16 is preferably formed from a plush material to further enhance the softness of the seat cover 16. The character 16 is positioned on the liner 14 such that when the seat cover 10 is placed within the shopping cart seat, the character 16 appears to be seated within the shopping cart seat. In this regard, the character 16 is generally positioned at a generally central location between the side peripheral edges 32, 34 of the liner 14. Therefore, when the infant or toddler sees the character 16 sitting in the shopping cart seat, the toddler or infant will be excited to join the character 16 in the shopping cart seat. Furthermore, once the toddler or infant is seated in the shopping cart seat, the toddler or infant will feel comforted by the companionship and security the toddler associates with the character 16. Along these lines, the toddler or infant may "engage" with the character 16 by babbling or talking with the character 16 while seated in the shopping cart seat.

The character 16 is defined by a character body 44 (see FIG. 2) and a character bottom 46 (see FIG. 2) connected to the character body 44 along a common edge 45 (see FIG. 2). The character body 44 may define the facial features of the character 16. Along these lines, the character body 44 may include eyes, a nose/beak and a mouth to accurately depict the face of the character 16.

The character body 44 is connected to the side panels 20, 22 and the rear panel 24, and the character bottom 46 is connected to the side panels 20, 22. The character body 44 and character bottom 46 are positioned such that when the child is placed within the seat, the child's buttocks rests against the character bottom 46 and the child's back rests against the character body 44. In this regard, the character bottom 46 is foldable relative to the character body 44 to properly position the character bottom 46 and character body 44 when placed within the shopping cart seat.

The character 16 may additionally include a pair of lateral members 48, 50 which extend outwardly from the character body 44. As shown in FIGS. 1-6, the lateral members 48, 50 are wings, although the lateral members 48, 50 may also define legs, fins, paws, arms, etc., depending on the character 16.

The character 16 may further include a pair of leg or feet members 52, 54 extending from the character bottom 46. The leg or feet members 52, 54 are sized and configured to pass through the leg openings 40, 42 formed within the front panel 18.

It is understood that the lateral members 48, 50 and feet members 52, 54 are optional elements of the character 16. In this regard, other embodiments of the seat cover 10 may include a character 16 without lateral members 48, 50 and/or feet members 52, 54.

The character body 44 and character bottom 46 are preferably connected to the liner 14 via sewing, welding or other attachment means known by those skilled in the art. By securely connecting the character body 44 to the liner 14, the character 16 is maintained in position during usage of the seat cover 10. It is understood that the children are active, even when seated within a shopping cart seat or a high chair. Thus, the character 16 is secured to the liner 14 to ensure that the character 16 does not slide over the liner 14 during periods of child activity or restless.

Although the preferred embodiment includes a more permanent attachment between the character 16 and the liner 14, it is also contemplated that other embodiments of the seat cover 10 may include a character body 44 and character bottom 46 that is removably connectable to the liner 14. For instance, hooks and loops fasteners (i.e., VELCRO™), magnets or other mechanical fasteners may be connected to the character 16 and the liner 14 to allow the character 16 to be secured to the liner 14 during use, and removed from the liner 14 during non-use. For instance, it may be desirable to remove the character 16 from the liner 14 to separately clean the character 16 or the liner 14.

The seat cover 10 further includes a safety harness 56 for securing the child to the seat cover 10. The safety harness 56 extends through a pair of openings 58, 60 within the seat cover 10. As shown in FIG. 2, the openings 58, 60 are located within the character body 44. The harness 56 includes a first end portion 62 connected to a first fastener 64 and a second end portion 66 connected to a second fastener 68. The length of the harness 56 may be selective increased or decreased via a length adjustable buckle 65 (see FIG. 2).

The first and second fasteners 64, 68 are connectable to each other to define a looped configuration around the toddler seated within the seat cover 10. The harness 56 may be wrapped around the shopping cart 12, high chair, or other seat to secure the toddler to the seat. It is understood that some shopping cart seats or high chair seats include built-in safety harnesses and thus, the pair of openings 58, 60 may be used to accommodate the built-in safety harness of the seat. In this respect, the safety harness 56 of the seat cover 10 may be removed to allow for proper usage of the built-in safety harness of the seat.

According to one embodiment, the seat cover 10 includes one or more toy attachment members 70 for attaching toys to the seat cover 10. As shown in FIG. 1, the seat cover 10 includes a toy attachment loop 70 connected to the front panel 18 to which toys, a binky or the like may be attached. The location of the toy attachment member 70 on the front panel 18 is advantageous in that it is located in front of the toddler when the toddler is properly seated within the seat cover 10. It is understood that any number of toy attachment members 70 may be connected to the liner 14 and or character 16 at various locations throughout the seat cover 10 without departing from the spirit and scope of the present invention.

It is further contemplated that other embodiments of the seat cover 10 include a pocket panel/pocket body 72 connected to the liner 14 to define a pocket which may be used by the parent for storing keys, a wallet, a cell phone, or the like. A flap 74 may extend over the pocket to cover the pocket for securing items stored therein. The flap 74 may include a strip of hook and loop fastening material, which may engage with a strip of hook and loop fastening material on an external surface of the pocket body 72. According to one embodiment, the pocket body 72 includes a clear/transparent front window so child can play video games (i.e., phone apps) or watch videos on the parent's phone. However, the phone may reside safely and securely within the pocket body 72 to protect the phone while on the go. According to one embodiment, the pocket panel 72 includes a first pair of opposed edges defining a panel width, "W," and second pair of opposed edges defining a panel height, "H." In one implementation, the panel width is approximately 5.5 inches and the panel height is approximately 4 inches, although other dimensions may be used as desired.

As indicated above, the seat cover 10 may be deployed within a shopping cart seat. A typical shopping cart 12 includes a handlebar (not shown) which is typically grasped by the user and is used to push the shopping cart 12. The back wall of the shopping cart 12 also defines a pair of leg openings 76, 78. The shopping cart 12 is generally provided with a collapsible wall, which when actuated toward the front of the shopping cart (i.e., away from the handlebar) defines a seat bottom 80 and a backrest/rear wall 82 of the seat of the shopping cart 12. The leg openings 76, 78 defined by the shopping cart back wall are disposed adjacent to and above the seat bottom 80 defined by the deployment of the collapsible wall.

The seat cover 10 is used by placing the liner 14 within the seat of the shopping cart 12 such that the back surface of the liner 12 directly engages the shopping cart 12. A portion of the front panel 18 is draped over the top edge of the deployed collapsible wall. The front panel 18 is sized such that the draping defines a fold over portion 84 extending over the top edge of the deployed collapsible wall. The fold over portion 84 includes the front peripheral edge 26 and the elastic strap 30. The elastic strap 30 is stretched to drape the fold over portion over the collapsible wall. The elastic strap 30 then contracts or is reduced in size to tightly conform the fold over portion 84 to the collapsible wall.

The liner 14 is further placed within the shopping cart seat such that the side panels 20, 22 reside adjacent the side walls of the shopping cart seat, and the rear panel 24 resides adjacent the rear wall 82 of the shopping cart seat. The rear panel 24 preferably includes a gusset which provides rigidity to allow the rear panel 24 to extend in a vertical direction along the rear wall 82 of the shopping cart seat. The rear panel 24 may optionally include a fold over flap which forms a pocket within which the top portion of the rear wall 82 is received. The fold over flap may include the elastic strip to conform the flap to the rear wall 82 when the seat cover 10 is deployed within the shopping cart seat.

When the child is removed from the shopping cart seat, the seat cover may be easily removed therefrom by undraping the liner over the collapsible wall the side walls and the rear wall of the shopping cart 12. Again, the elastic strips 30 may allow for temporary expansion of the peripheral edges of the liner to stretch around the walls to facilitate removal of the seat cover therefrom. Once removed, the seat cover 10 may be folded or rolled and stored in a diaper bag, purse or the like.

It is understood that the seat cover 10 may be fabricated in a variety of sizes, fabrics, colors, patterns, etc. Moreover, those of ordinary skill in the art will recognize that the seat cover 10 may include greater or fewer panels than those described above. For example, a single panel may be cut to assume the shape otherwise collectively defined by multiple panels attached to each other in a prescribed arrangement.

Figure 7:
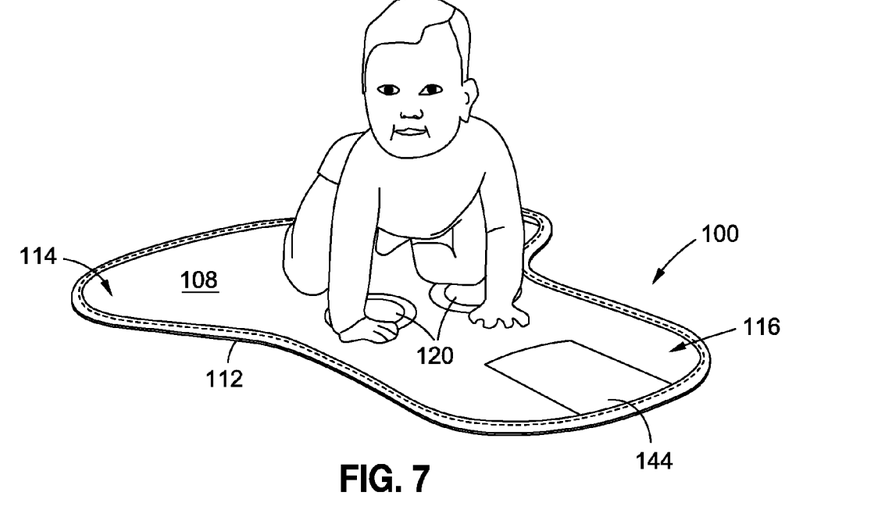
FIG. 7 is an upper perspective view of the insert in a play-mat configuration.

Referring now to FIGS. 4-9, there is shown a multi-functional insert 100 which is constructed in accordance with a second embodiment of the present invention, and is selectively adaptable for use as a seat cover (see FIGS. 8 and 9) and a play mat/changing pad (see FIG. 7). As a seat cover, the insert 100 may be used in a high chair 102, shopping cart 104 or other similar seats configured for infants and toddlers. The insert 100 may also be removed from the seat and placed on a flat surface for use as a play mat or changing pad. Thus, the insert 100 is extremely adaptable and allows the parent to own a single insert 100, rather than owning a separate seat cover and play mat.

The insert 100 includes a primary panel 106 including opposed first and second surfaces 108, 110 and a peripheral edge 112. According to one embodiment, the primary panel 106 is sized to include a wide section at a first end portion 114 thereof, wherein the wide section transitions into a narrow section at an opposing second end portion 116. As will be explained in more detail below, the wide section is configured to fit over the handlebars of a shopping cart 104 or high chair 102, while the narrow section is configured to be placed within the seat and extend over the seat bottom and backrest of the chair.

The insert 100 further includes a pair of leg openings 118 extending through the primary panel 106 from the first surface 108 to the second surface 110. The leg openings 118 shown in the Figures define a circular shape, although other shapes may be defined without departing from the spirit and scope of the present invention.

A pair of opening covers 120 may be connected to the primary panel 106 for selectively covering/uncovering the leg openings 118. Along these lines, each opening cover 120 is moveable relative to the primary panel 106 to cover/uncover a respective one of the leg openings 118. Each opening cover 120 is moveable between an open position and a closed position relative to the primary panel 106. When the opening cover 120 is in the open position, the leg opening 118 is uncovered and the child's legs may be advanced therethrough. Conversely, when the covers 120 are in the closed position, the leg openings 118 are covered to provide a substantially uniform surface when the insert 100 is used as a play mat, as described in more detail below.

The opening covers 120 shown in the Figures define a shape that is substantially complimentary to the shape of the leg openings 118, yet are slightly larger than the leg openings 118 to ensure complete coverage of the respective openings 118 when the covers 120 are in the closed position. The opening covers 120 shown in the figures define a circular shape having a diameter that is slightly larger than the diameter of the leg openings 118.

Fasteners 122a, 122b may be used to secure the covers 102 to the primary panel 106 when the covers 120 are in the closed position. In the exemplary embodiment, the fasteners 122a, 122b include complimentary hook and loop fasteners, i.e., VELCRO®, on the opening cover 120 and the primary panel 106 to secure the cover 120 to the primary panel 106, although other fasteners, such as snaps, buttons, magnets or the like may also be used.

According to one embodiment, the insert 100 additionally includes an activity pocket 124 connected to the primary panel 106, with the activity pocket 124 being specifically configured and adapted to allow a caregiver to place an entertainment device, such as a smart phone or similar electronic device, within the activity pocket 124 for entertaining the infant/toddler. For instance, the parent or caregiver may play a video on the entertainment device which may entertain the infant/toddler while seated within the shopping cart 104 or high chair 102. It is also contemplated that the child may engage with the entertainment device stowed within the activity pocket 124 to play a video game or a smart phone application (i.e., an "app").

The activity pocket 124 includes a pocket panel 126 connected to the primary panel 106, such that the primary panel 106 and pocket panel 126 collectively define the activity pocket 124. The pocket panel 126 is preferably formed from a transparent or translucent material to allow the infant/toddler to see the entertainment device disposed within the activity pocket 124. In the exemplary embodiment, the pocket panel 126 has a quadrangular shape, and is connected to the primary panel 106 adjacent three edges of the pocket panel 126 to define a closed end portion and an opening at an open end portion. As will be explained in more detail below, the activity pocket 124 is preferably positioned on the primary panel 106 such that when the insert 100 is disposed in the shopping cart 104 or high chair 102, the activity pocket 124 is positioned near the handlebars in front of the infant/toddler to allow the infant/toddler to interact with the entertainment device stowed within the activity pocket 124.

Figure 4:
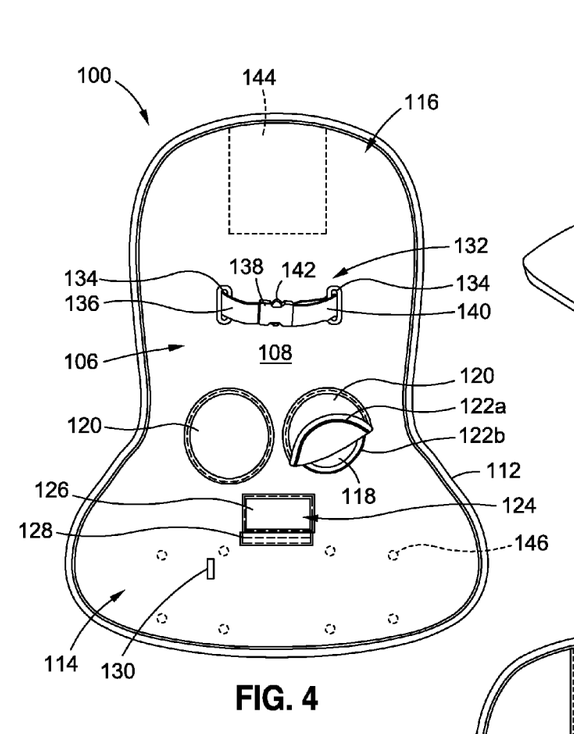
FIG. 4 is a top view of a multi-functional insert constructed in accordance with a second embodiment of the present invention.
Figure 5:
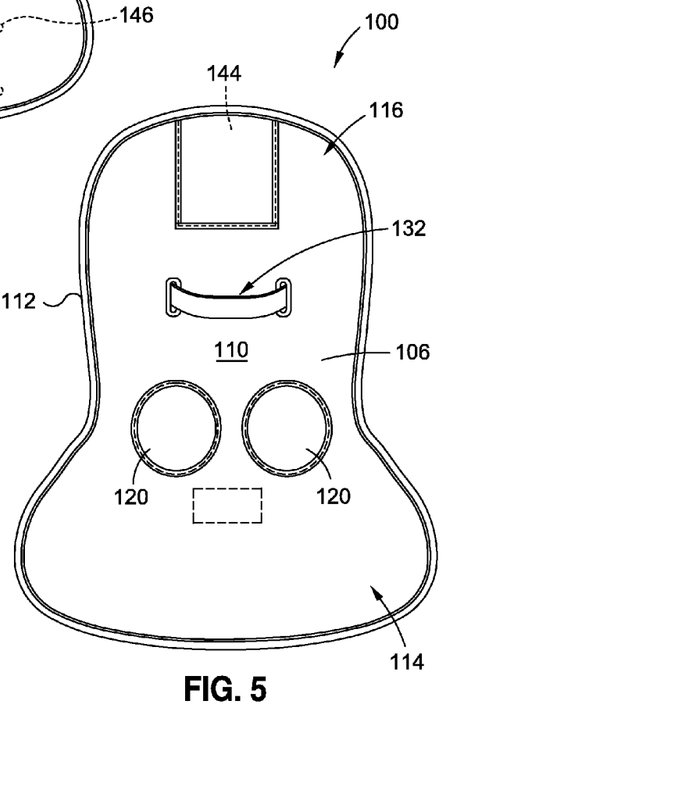
FIG. 5 is a bottom view of the insert shown in FIG. 4.
Figure 6:
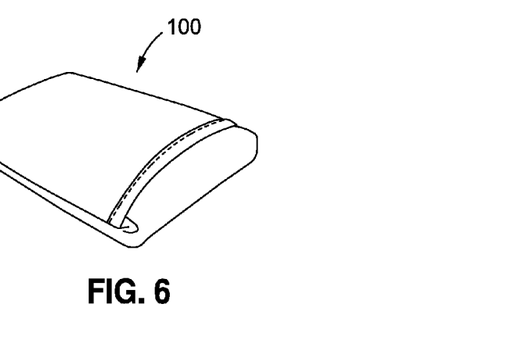
FIG. 6 is an upper perspective view of the insert in a stowed arrangement.

A pocket closure flap 128 may be used to selectively open and close the pocket opening. The pocket closure flap 128 shown in FIG. 4 is quadrangular in shape and is sized to overlap the pocket opening when in a closed position. The pocket closure flap 128 may have a fixed end portion coupled to the primary panel 106, and a free end portion which may be moved toward the pocket panel 126 to close the pocket opening, and moved away from the pocket panel 126 to open the pocket opening. The closure flap 128 and pocket panel 126 may include complimentary fasteners to secure the flap 128 to the panel 126 when the flap 128 is in the closed position. Exemplary fasteners which may be used include, but are not limited to, hook and loop fasteners, magnetic fasteners, snap fasteners, buttons, or other fasteners known in the art. When the flap 128 is closed, the contents stowed within the activity pocket, such as a smart phone, may be secured therein so as to mitigate unwanted removal thereof by the infant/toddler.

In addition to the foregoing, various implementations of the insert 100 may include a toy attachment member 130 coupled to the primary panel 106 and configured to facilitate attachment of a toy thereto. The toy attachment member 130 may include a loop to which one or more toys may be attached. The position of the toy attachment member 130 on the primary panel 106 is such that the toy attachment member 130 is positioned in front of the child when seated in the shopping cart 104 or high chair 102. In most cases, the toy attachment member 130 is positioned near the activity pocket 124 and generally resides near the handlebar when the insert 100 is placed within the seat.

The insert 100 further includes a strap 132 for connecting the insert 100 to the shopping cart 104 or high chair 102. The strap 132 passes through openings 134 formed within the primary panel 106, and is configured to extend around portions of the shopping cart 104 or high chair 102 to secure the insert 100 thereto. The strap 132 may also be extensible about the infant/toddler seated within the shopping cart 104 or high chair 102 to secure the infant/toddler therein.

The strap 132 includes a first end portion 136 having a first connector 138 connected thereto, and a second end portion 140 having a second connector 142 connected thereto. The first and second connectors 138, 142 are cooperatively engageable with each other to selectively dispose the strap 132 in a looped configuration. An adjustment member may be connected to the strap and may be slidable therealong to selectively adjust the length of the strap 132. As used herein, the strap length refers to the distance along the strap 132 between the first connector 138 and the second connector 142.

According to one embodiment, the insert 100 includes a stowing pocket 144 formed within the primary panel 106 to allow the primary panel 106 to be folded into itself for quick and easy storage of the insert 100. From the stowed position, the insert 100 may be easily deployed by removing the primary panel 106 from the stowing pocket 144 and unfolding the primary panel 106.

With the basic structural features of the insert 100 being described above, usage of the insert 100 will now be described with reference to FIGS. 7-9. Referring now to FIG. 7, the insert 100 may assume a play-mat configuration for usage by an infant/toddler as a play mat. The insert 100 may be placed on a generally flat support surface, such as a floor, to allow the infant/toddler to play on the insert 100. In the play-mat configuration, the opening covers 120 are preferably in the closed position to cover the leg openings 118 so as to provide a substantially continuous surface upon which the infant/toddler may play. When the insert 100 is in the play-mat configuration, it is also contemplated that the insert 100 may be used as an extra-large changing mat.

Figure 8:
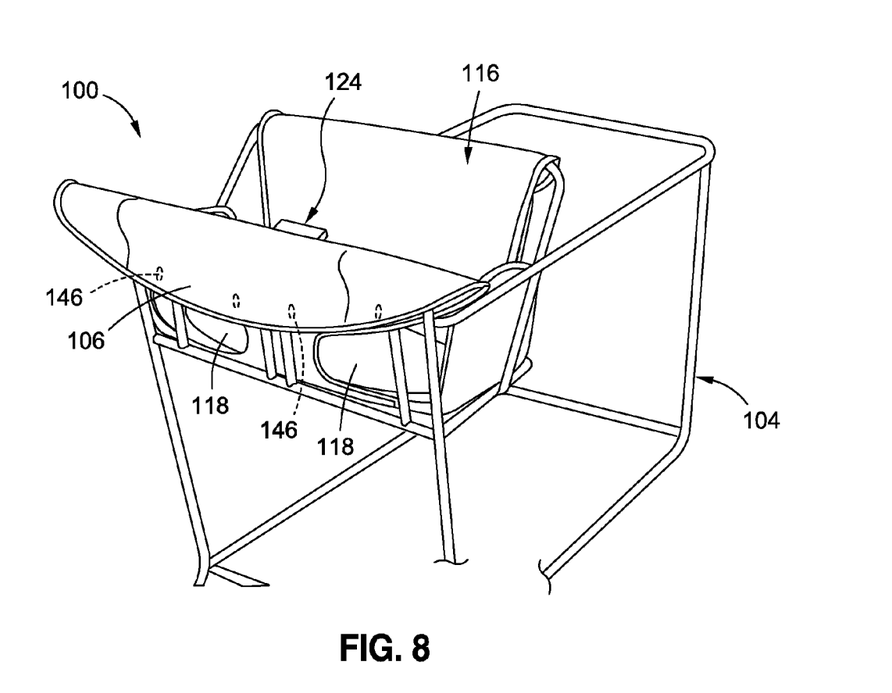
FIG. 8 is an upper perspective view of the insert deployed in a shopping cart to assume a shopping cart configuration.

Referring now to FIG. 8, the insert 100 may be easily transitioned from the play mat configuration to a shopping cart configuration, wherein the insert 100 is placed within the seat of a shopping cart 104 to line the seat for providing a safer (i.e., more healthy), more comfortable, and more entertaining experience for the infant/toddler seated therein. The wide, first end portion 114 of the primary panel 106 is draped over the handlebar, while the narrow, second end portion 116 of the insert 100 is draped over the backrest of the shopping cart seat. The insert 100 may also be configured to include side panels which extend over the side walls of the seat, although other embodiments of the insert 100 may be formed without the side panels.

The opening covers 120 are removed to uncover the leg openings 118 on the insert 100. When the insert 100 is placed within the shopping cart 104, the leg openings 118 on the insert 100 are aligned with the leg openings 118 on the shopping cart 104.

The insert 100 may include fasteners 146 at the first end portion 114 thereof to secure the insert 100 to the handlebar. The fasteners 146 may include complimentary pairs of magnets embedded within the primary panel 106 which engage with each other when the first end portion 114 is folded over the handlebar. The fasteners 146 may also include snaps or other fasteners known in the art, which may be connected to the outer surface of the primary panel 106 to facilitate the fastened configuration shown in FIG. 8.

Figure 9:
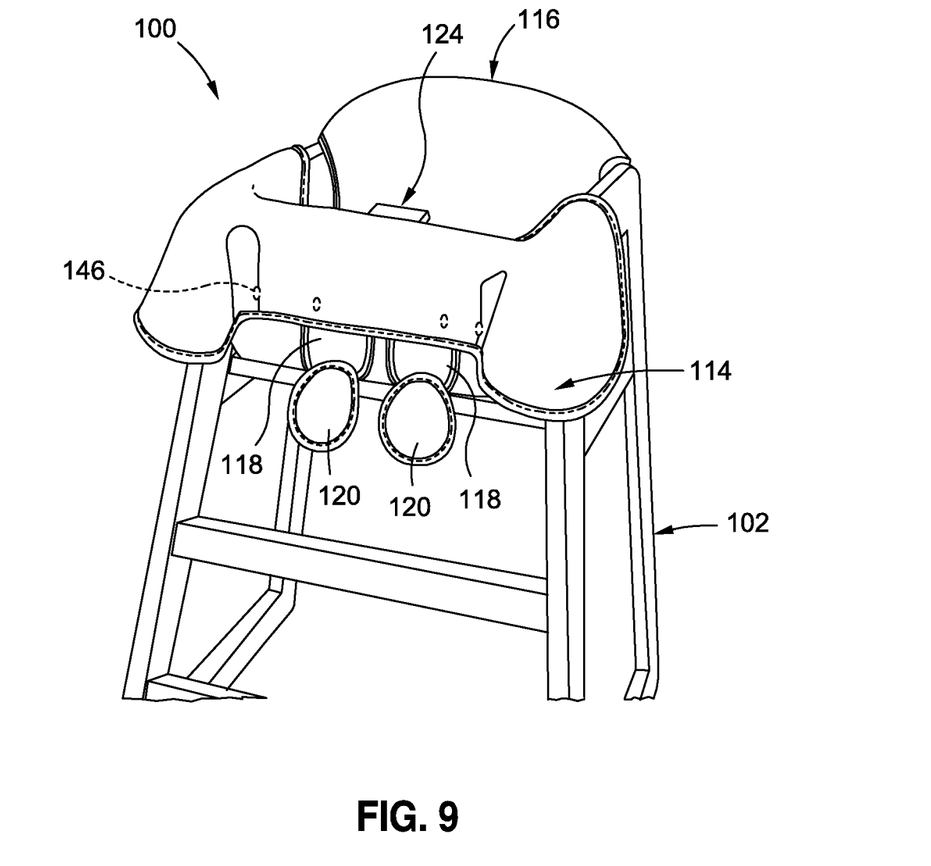
FIG. 9 is an upper perspective view of the insert deployed in a high chair to assume a high chair configuration.

Referring now to FIG. 9, the insert 100 may also be deployed in a high chair 102 to assume a high chair configuration, which is very similar to the shopping cart configuration described above. In the high chair configuration, the insert 100 is deployed within the high chair seat, such that the wide, first end portion 114 is generally folded over the handlebar and the narrow, second end portion 116 is extended over the backrest of the high chair. The fasteners 146 located in the first end portion 114 are connected to each other to secure the first end portion 114 to the handlebar.

The opening covers 120 are moved to the open position to uncover the leg openings 118, which are aligned with the leg opening(s) in the high chair to allow the legs of the infant/toddler to pass therethrough when seated in the high chair 102.

The insert 100 is preferably formed of a neoprene material which repels heat and water. Therefore, when the infant/toddler is placed on the insert 100, either in the play-mat configuration, shopping cart configuration, or the high chair configuration, the neoprene material repels heat and water to provide a safe and comfortable experience for the infant/toddler.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A seat cover for a seat having a seat bottom, a backrest, a pair of leg openings and a handlebar, the seat cover comprising:
    a primary panel configured to be selectively engageable with the seat, the primary panel having;
        a forward panel portion extendable over the handlebars when the primary panel is engaged with the seat;
        a rear panel portion extendable over the backrest when the primary panel is engaged with the seat;
        opposed front and back surfaces; and
        a pair of panel openings extending through the primary panel between the front and back surfaces;
    a pocket panel coupled to the forward panel portion and overlapping the forward panel portion to define a pocket and a corresponding pocket opening adjacent the front surface of the primary panel;
    a fastening member coupled to the primary panel and configured to selectively maintain a portion of the primary panel in releasable engagement to the handlebar of the seat; and
    a plush character coupled to the primary panel;
    the primary panel, the pocket panel and the plush character being sized and configured such that when the primary panel is releasably engaged to the handlebar, extended over the seat bottom and backrest, the pair of panel openings are aligned with the pair of leg openings, the plush character is disposed adjacent the backrest and the pocket panel is positioned adjacent the handlebar and is generally facing the plush character.

2. The seat cover recited in claim 1, wherein the pocket panel is formed from a transparent material.

3. The seat cover recited in claim 1, wherein the pocket is collectively defined by the forward panel portion and the pocket panel.

4. The seat cover recited in claim 1, wherein the pocket panel is generally rectangular and includes an opposed pair of lateral edges, which are separated from each other by a distance of approximately 5.5 inches, and an opposed pair of longitudinal edges, which are separated from each other by a distance of approximately 4 inches.

5. The seat cover recited in claim 1, further comprising a closure flap connected to the primary panel and moveable relative to the pocket panel to selectively cover and uncover the pocket opening.

6. The seat cover recited in claim 1, further comprising a pair of leg flaps coupled to the primary panel adjacent respective ones of the pair of panel openings.

7. The seat cover recited in claim 1, further comprising a restraint belt coupled to the primary panel, the restraint belt having a pair of end portions selectively engageable with each other to restrain a child within the seat.

8. A seat cover for a seat having a seat bottom, a backrest, a pair of leg openings and a handlebar, the seat cover comprising:
    a primary panel selectively engageable with the seat and having:
        a forward panel portion extendable over the handlebars when the primary panel is engaged with the seat;
        a rear panel portion extendable over the backrest when the primary panel is engaged with the seat; and
        opposed front and back surfaces, the primary panel having a pair of panel openings extending through the primary panel between the front and back surfaces;
    a pocket panel coupled to the forward panel portion and overlapping the forward panel portion to define a pocket and a corresponding pocket opening adjacent the front surface of the primary panel;
    a fastening member coupled to the primary panel and configured to selectively maintain a portion of the primary panel in releasable engagement to the handlebar of the seat; and
    the primary panel and the pocket panel being sized and configured such that when the primary panel is releasably engaged to the handlebar, extended over the seat bottom and backrest, the pair of panel openings are aligned with the pair of leg openings and the pocket panel is positioned adjacent the handlebar.

9. The seat cover recited in claim 8, wherein the pocket panel is formed from a transparent material.

10. The seat cover recited in claim 8, wherein the pocket is collectively defined by the forward panel portion and the pocket panel.

11. The seat cover recited in claim 8, wherein the pocket panel is generally rectangular and includes an opposed pair of lateral edges, which are separated from each other by a distance of approximately 5.5 inches, and an opposed pair of longitudinal edges, which are separated from each other by a distance of approximately 4 inches.

12. The seat cover recited in claim 8, further comprising a closure flap connected to the primary panel and moveable relative to the pocket panel to selectively cover and uncover the pocket opening.

13. The seat cover recited in claim 8, further comprising a pair of leg flaps coupled to the primary panel adjacent respective ones of the pair of angi openings.

14. The seat cover recited in claim 8, further comprising a restraint belt coupled to the primary panel, the restraint belt having a pair of end portions selectively engageable with each other to restrain a child within the seat.

15. A multi-function insert adapted for use as a play mat and a seat cover for a seat having a handlebar, a seat bottom, a backrest, and a pair of leg openings, the multifunction insert comprising:
   a primary panel selectively engageable with the seat and having:
      a forward panel portion extendable over the handlebars when the primary panel is engaged with the seat;
      a rear panel portion extendable over the backrest when the primary panel is engaged with the seat; and
      opposed front and back surfaces, the primary panel having a pair of panel openings extending through the primary panel between the front and back surfaces;
   a pair of flaps connected to the primary panel adjacent respective ones of the pair of panel openings and moveable relative to the primary panel between respective open and closed positions;
   a pocket panel coupled to the forward panel portion to define a pocket and a corresponding pocket opening adjacent the front surface of the primary panel;
   a fastening member coupled to the primary panel and configured to selectively maintain a portion of the primary panel in releasable engagement to the handlebar of the seat; and
   the primary panel and the pocket panel being sized and configured such that when the primary panel is releasably engaged to the handlebar, extended over the seat bottom and backrest, the pair of panel openings are aligned with the pair of leg openings and the pocket panel is positioned adjacent the handlebar in generally opposed relation to the rear panel portion.

16. The seat cover recited in claim 15, wherein the pocket panel is formed from a transparent material.

17. The seat cover recited in claim 15, wherein the pocket is collectively defined by the forward panel portion and the pocket panel.

18. The seat cover recited in claim 15, wherein the pocket panel is generally rectangular and includes an opposed pair of lateral edges, which are separated from each other by a distance of approximately 5.5 inches, and an opposed pair of longitudinal edges, which are separated from each other by a distance of approximately 4 inches.

19. The seat cover recited in claim 15, further comprising a closure flap connected to the primary panel and moveable relative to the pocket panel to selectively cover and uncover the pocket opening.

20. The seat cover recited in claim 15, further comprising a restraint belt coupled to the primary panel, the restraint belt having a pair of end portions selectively engageable with each other to restrain a child within the seat.

\* \* \* \* \*